May 19, 1925.

W. LA HODNY 1,538,338

MOUNTING FOR MIRRORS AND THE LIKE

Filed May 11, 1921

Inventor
William La Hodny
by Guyer & Topp
Attorneys

Patented May 19, 1925.

1,538,338

UNITED STATES PATENT OFFICE.

WILLIAM LA HODNY, OF BUFFALO, NEW YORK, ASSIGNOR TO OTTO GLASS & MIRROR COMPANY, OF BUFFALO, NEW YORK, A CORPORATION OF NEW YORK.

MOUNTING FOR MIRRORS AND THE LIKE.

Application filed May 11, 1921. Serial No. 468,504.

*To all whom it may concern:*

Be it known that I, WILLIAM LA HODNY, a citizen of the United States, residing in Buffalo, in the county of Erie and State of New York, have invented new and useful Improvements in Mountings for Mirrors and the like, of which the following is a specification.

This invention relates to a bracket or mounting for supporting a mirror or similar plate on an automobile or elsewhere.

The object of this invention is to provide simple, efficient and inexpensive means whereby a firm grip of the bracket on the plate may be obtained.

In the accompanying drawings.

Similar characters of reference refer to like parts throughout the several views.

Figure 1:
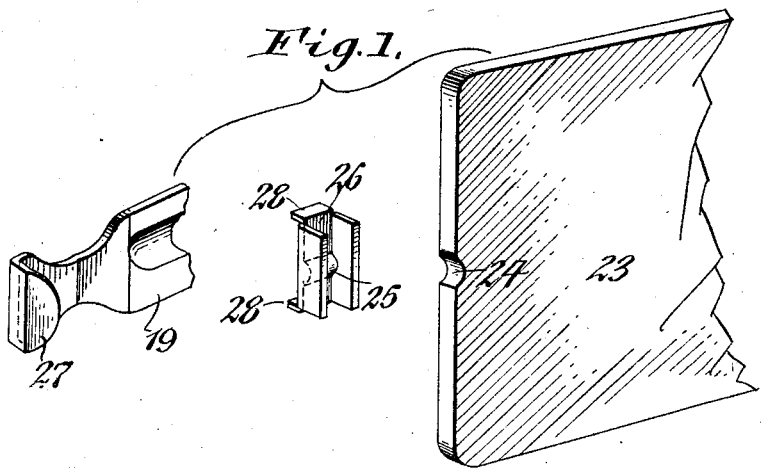
Figure 1 is a perspective view showing the several elements of my invention separate.
Figure 2:
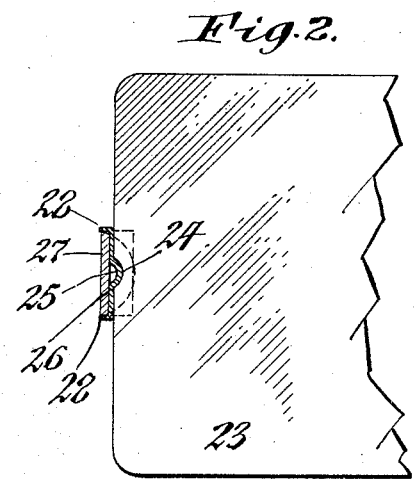
Figure 2 is a fragmentary horizontal section of the parts shown in Fig. 1 assembled.
Figure 3:
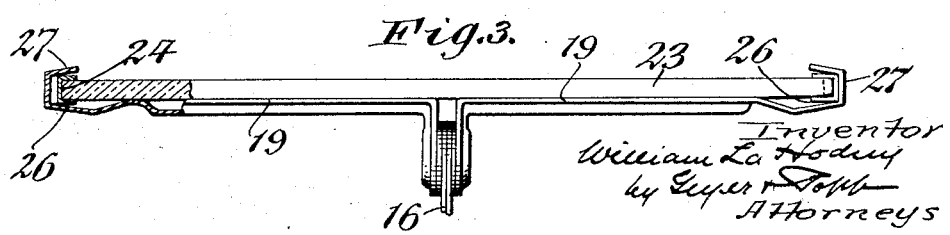
Figure 3 is a top view, partly in section, of a bracket and plate containing parts similar to those in Figs. 1 and 2 assembled.

In Figs. 1, 2 and 3 is shown a form of my invention, which is more particularly designed for supporting a mirror plate or a colored anti-glare shield or plate 23 on an automobile. In this construction the plate 23 is of substantially rectangular form and provided in each of its vertical edges, preferably midway between the upper and lower edges thereof with a notch or recess 24 which is engaged by a tenon or a projection 25 extending inwardly from the bight of a protecting member having a body 26 which is straight lengthwise but U-shaped in cross section and receives in its channel the edge of the glass plate and thus holds these parts against vertical displacement relatively to each other. The hooks 27 of the bracket 19 in this case engage with the outer side of the U-shaped bodies of the protecting members and these parts are interlocked against relative movement in a vertical direction by means of ears, lugs, or lips 28 projecting outwardly from the upper and lower ends of the body of each protecting member and thereby retain the latter in engagement with the respective hook.

By means of this invention it is possible to firmly fasten the glass plate of a mirror or anti-glare shield to a bracket without liability of injuring the glass plate in any way so that the same will always remain in a serviceable and sightly condition.

I claim as my invention:

A plate provided in its edge with a notch, a protecting member having a body of U-form in cross section the channel of which receives the edge of said plate, an inward projection in the channel of said body engaging with said notch and outward projections at the ends of said body, and a bracket having a hook which engages the outer side of said body between the outward projections thereof.

WILLIAM LA HODNY.